(12) United States Patent
Fretwell

(10) Patent No.: US 9,274,027 B2
(45) Date of Patent: Mar. 1, 2016

(54) APPARATUS AND PROCESS FOR MEASURING THE DEPTH OF A GROOVE IN A ROTOR OF A GAS TURBINE ENGINE

(71) Applicant: Siemens Energy, Inc., Orlando, FL (US)

(72) Inventor: Richard Marc Fretwell, Lake Lure, NC (US)

(73) Assignee: Siemens Energy, Inc., Orlando, FL (US)

( * ) Notice: Subject to any disclaimer, the term of this patent is extended or adjusted under 35 U.S.C. 154(b) by 321 days.

(21) Appl. No.: 13/949,792

(22) Filed: Jul. 24, 2013

(65) Prior Publication Data

US 2015/0027210 A1 Jan. 29, 2015

(51) Int. Cl.
*G01M 15/14* (2006.01)
*G01B 5/18* (2006.01)
*G01B 3/28* (2006.01)

(52) U.S. Cl.
CPC ............. *G01M 15/14* (2013.01); *G01B 3/28* (2013.01); *G01B 5/18* (2013.01)

(58) Field of Classification Search
CPC ............. G01B 3/28; G01B 5/18; G01B 3/20; G01B 5/02; G01B 5/12; G01B 5/20; G01B 7/26; G01B 11/22; G01B 3/00; G01B 3/002

USPC ............. 33/501, 501.09, 501.12, 501.14, 33/501.17, 542, 552, 557
See application file for complete search history.

(56) References Cited

U.S. PATENT DOCUMENTS

| | | | |
|---|---|---|---|
| 2,443,881 A * | 6/1948 | Emery et al. | 33/501.3 |
| 4,260,331 A | 4/1981 | Goodwin | |
| 4,419,830 A * | 12/1983 | Miller | 33/558 |
| 4,824,328 A | 4/1989 | Pisz et al. | |
| 5,157,845 A * | 10/1992 | Possati et al. | 33/544 |
| 5,205,046 A * | 4/1993 | Barnett et al. | 33/533 |
| 6,490,805 B1 * | 12/2002 | Forschler et al. | 33/542 |
| 6,889,541 B1 * | 5/2005 | Kang | 33/542 |
| 7,665,221 B2 * | 2/2010 | Bennison et al. | 33/544 |
| 2015/0027210 A1 * | 1/2015 | Fretwell | 73/112.01 |

* cited by examiner

*Primary Examiner* — Yaritza Guadalupe-McCall

(57) ABSTRACT

An apparatus is provided for measuring a depth of a groove defined between adjacent steeples of a rotor of a turbine. The groove is adapted to receive a root of a blade. The apparatus may comprise: a measuring tool comprising: a fixture; and first and second depth measuring devices associated with the fixture for measuring the depth of the groove at two spaced apart locations.

17 Claims, 7 Drawing Sheets

APPARATUS AND PROCESS FOR MEASURING THE DEPTH OF A GROOVE IN A ROTOR OF A GAS TURBINE ENGINE

FIELD OF THE INVENTION

The present invention relates to an apparatus and process for measuring the depth of a groove located between adjacent steeples of a rotor of a turbine section in a gas turbine engine.

BACKGROUND OF THE INVENTION

There are a series of rows of stationary vanes and rotating blades in a turbine section of a gas turbine engine. In one known turbine section, the blades are coupled to a solid rotor. For each row of blades, the rotor comprises a series of circumferentially spaced apart steeples, wherein adjacent steeples define a groove for receiving a root of a corresponding blade. Hot working gases travel to the rows of blades. As the working gases expand through the turbine section, the working gases cause the blades and, hence, the rotor to rotate.

It is known to measure the depth of a third row of rotor grooves so as to determine any creep which may have occurred in the adjacent steeples. Hence, if the depth of the groove has increased, this is indicative of creep, which may limit the life of the rotor. To measure the depth of each third row groove, a measuring tool has been used that takes a single measurement within the groove. Since it is desirable to make two axially spaced apart measurements along a groove, the tool has to be removed, reversed and re-inserted after each measurement. Hence, for each groove, the tool has to be handled twice.

SUMMARY OF THE INVENTION

In accordance with a first aspect of the present invention, an apparatus is provided for measuring a depth of a groove defined between adjacent steeples of a rotor of a turbine. The groove is adapted to receive a root of a blade. The apparatus may comprise: a measuring tool comprising: a fixture; and first and second depth measuring devices associated with the fixture for measuring the depth of the groove at two spaced apart locations.

The fixture may comprise a main body and at least one locating element extending from the main body to engage with at least one steeple so as to properly locate the main body relative to the at least one steeple.

The at least one locating element may comprise a first locating element extending from a first side of the main body for engaging a first rotor steeple and a second locating element extending from a second side of the main body for engaging a second rotor steeple. The first locating element may be spring biased.

Each of the first and second depth measuring devices may comprise a dial indicator.

The apparatus may further comprise a calibration block for receiving the measuring tool so as to allow the first and second depth measuring devices to be calibrated.

The calibration block may comprise a U-shaped structure having slots for receiving the first and second locating elements when the measuring tool is located in the calibration block.

The first and second depth measuring devices may be mounted to the fixture and axially spaced apart so as to measure the depth of the groove at two axially spaced apart locations.

In accordance with a second aspect of the present invention, a process is provided for measuring a depth of a groove defined between adjacent steeples of a rotor of a turbine. The groove is adapted to receive a root of a blade. The process may comprise: providing a measuring tool comprising a fixture and first and second depth measuring devices associated with the fixture; locating the measuring tool within the groove defined between the adjacent rotor steeples; and determining the depth of the groove at two spaced apart locations using the first and second depth measuring devices.

The process may further comprise calibrating the first and second depth measuring devices prior to locating the measuring tool within the groove.

Each of the first and second measuring devices may comprise a dial indicator. The calibrating may comprise: placing the measuring tool in a calibration block such that the fixture is located a predetermined distance from a bottom surface of the calibration block; and, thereafter, adjusting each dial indicator.

Adjusting may comprise zeroing out each indicator.

Locating may comprise positioning the measuring tool within the groove defined between the adjacent rotor steeples such that the first locating element is positioned between adjacent teeth on a first rotor steeple and the second locating element is positioned between adjacent teeth on a second rotor steeple.

Determining the depth of the groove at two spaced apart locations preferably occurs without removing and reinserting the measuring tool in the groove between taking the two measurements.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
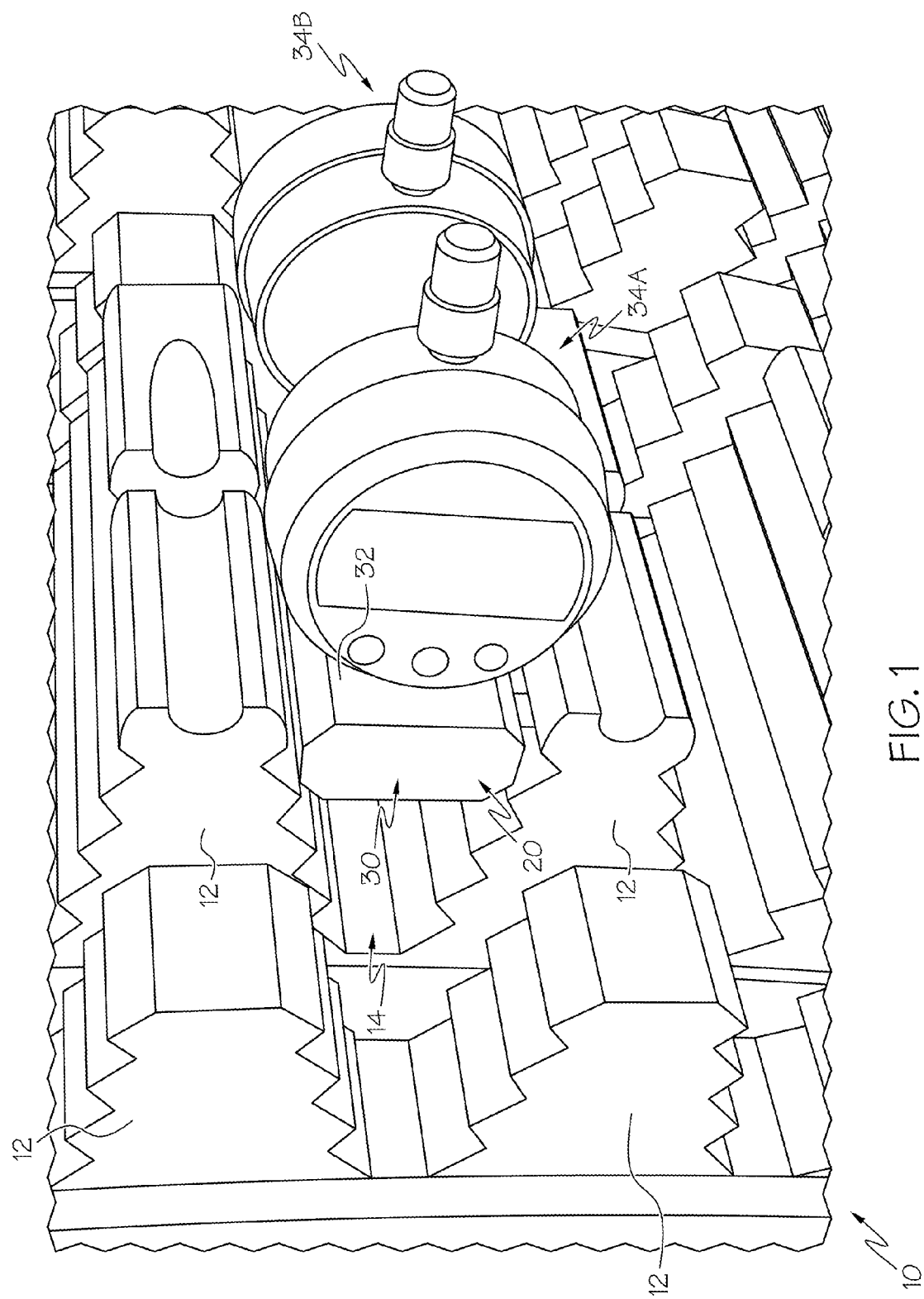
FIG. 1 is a view of a portion of a rotor having steeples and illustrating a measuring tool positioned in a groove between adjacent steeples.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In a turbine section of a gas turbine engine, there are a series of rows of stationary vanes and rotating blades. In one known turbine section, the blades are coupled to a solid rotor. For each row of blades, the rotor comprises a series of circumferentially spaced apart steeples, wherein pairs of adjacent steeples define grooves for receiving roots of corresponding blades. For example, in FIGS. 1 and 2, a portion of a rotor 10 is shown having a plurality of steeples 12. A groove 14 is defined between each pair of circumferentially adjacent steeples 12. In the illustrated embodiment, the steeples 12 have a generally "firtree" shape in cross section. The grooves 14 have a shape similar to an inverted firtree. Hot working gases travel to the rows of blades. As the working gases expand through the turbine, the working gases cause the blades and, hence, the rotor to rotate.

It is known to measure the depth of grooves 14 between steeples 12 in a given row of steeples/grooves of a rotor 10 in a turbine section of a gas turbine engine, e.g., a third row of grooves, so as to determine if creep has occurred in the rotor and, more specifically, in the steeples 12. "Creep" may occur if the length of adjacent steeples defining a corresponding groove increases such that the depth of the corresponding groove increases. Creep magnitude or amount may be used with other data to estimate the remaining life of the rotor.

In accordance with the present disclosure, an apparatus 20 is provided for measuring a depth of a groove 14 defined between adjacent steeples 12 of a rotor 10 of a turbine. In the illustrated embodiment, the apparatus 20 comprises a measuring tool 30 and a calibration block 50, see FIGS. 1, 2, 6 and 7.

In the illustrated embodiment, the measuring tool 30 comprises a fixture 32 and first and second depth measuring devices 34A and 34B associated with the fixture 32 for measuring the depth of a groove 14 at two axially spaced apart locations along the groove 14. Each third row groove 14 may have a length in an axial direction of from about 115 mm to about 130 mm.

In the illustrated embodiment, each of the depth measuring devices 34A and 34B may comprise a dial indicator 35, one of which comprises an electronic dial indicator commercially available from Mitutoyo. Each dial indicator 35 may comprise an indicator body 35A, a measuring probe 35B extending from the indicator body 35A and a display portion 35C having a visible screen 35D for indicating an amount by which a depth D of a groove 14 at a given point axially along the groove 14 is off from a predefined, designed depth value, see FIG. 2. In the illustrated embodiment, the measuring devices 34A and 34B are axially spaced apart from one another so as to measure the depth D of a groove 14 at two axially spaced apart points along the groove 14. The measuring device 34A is rotated 180 relative to the measuring device 34B such that the visible screens 35A of the measuring devices 34A and 35B face outwardly and away from one another for easy viewing by a technician, see FIGS. 1 and 7. It is preferred to take depth measurements of each groove 14 at two axially spaced apart locations to improve accuracy of measurement. Because the measuring tool 30 comprises first and second measuring devices 34A and 34B, the tool 30 need only be mounted within a groove 14 a single time to take two axially spaced apart measurements.

As will be discussed further below, each measuring device 34A and 34B is calibrated using the calibration block 50 prior to measurements being taken within a groove 14. In the illustrated embodiment, the measuring devices 34A and 34B are calibrated to the predefined, designed depth value for a groove 14, such that when so calibrated, the visible screen 35D on each measuring device 34A and 34B will have a zero reading. Accordingly, when the depth D of the groove 14 at a given axial measurement location differs from the predefined, designed depth value, then the corresponding measuring device 34A and 34B will indicate the amount, i.e., magnitude, by which the groove depth D is different from the predefined value. The visible screen 35D may also provide a sign, either positive or negative, indicating if the depth D is greater than or less than the predefined, designed value.

Figure 3:
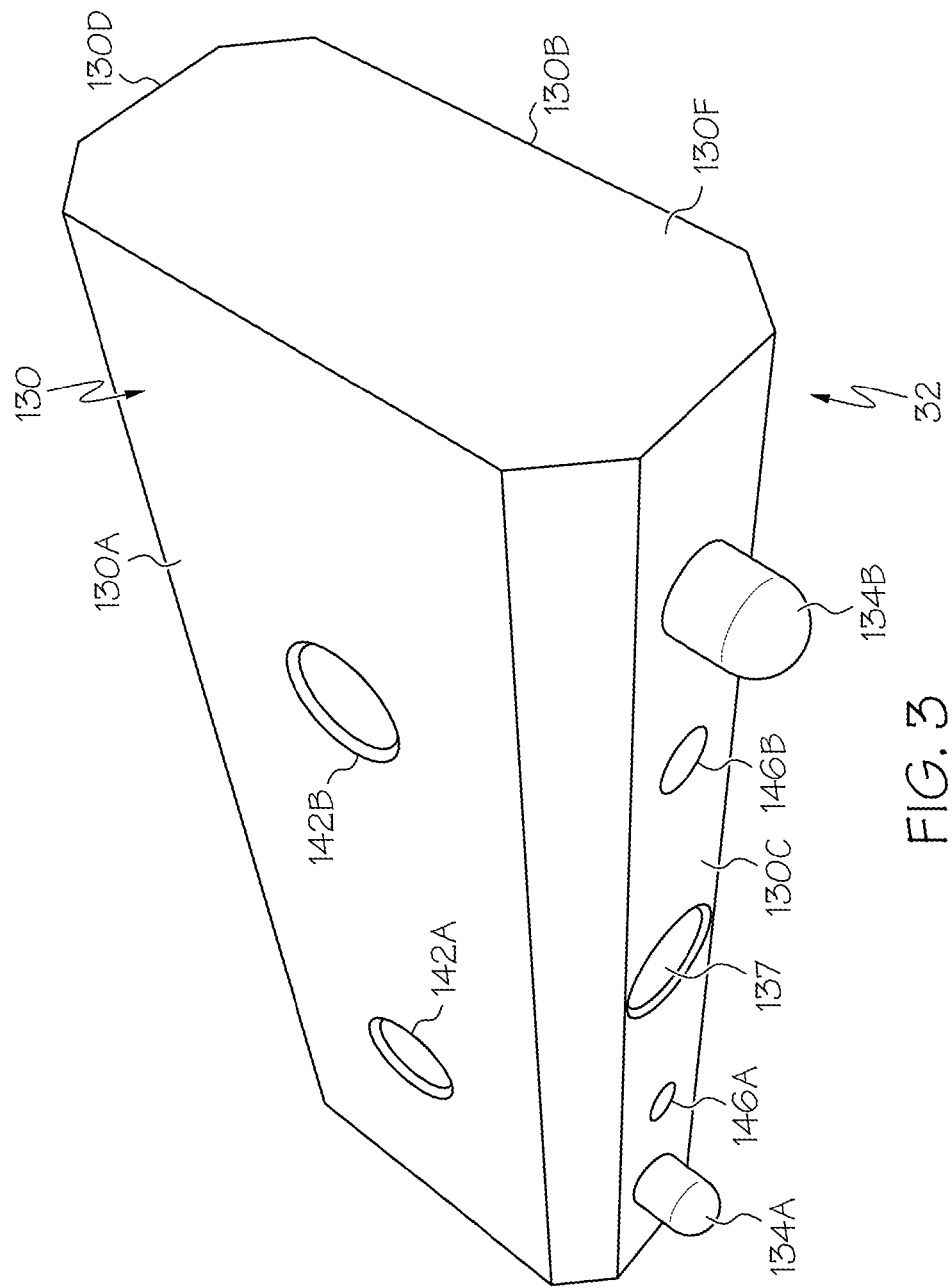
FIGS. 3 and 4 are perspective views of a fixture of the measuring tool illustrated in FIGS. 1 and 2.
Figure 4:
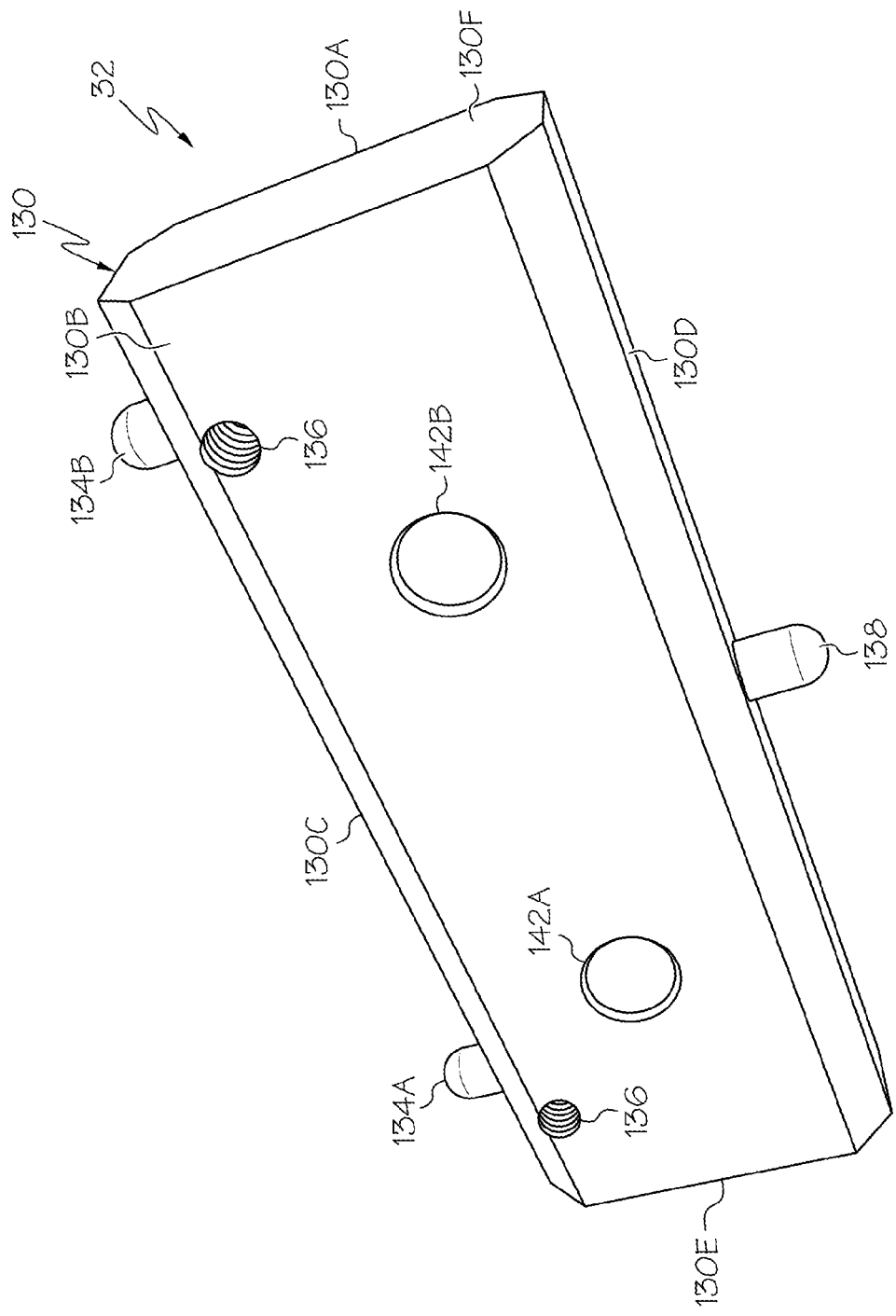
Figure 5:
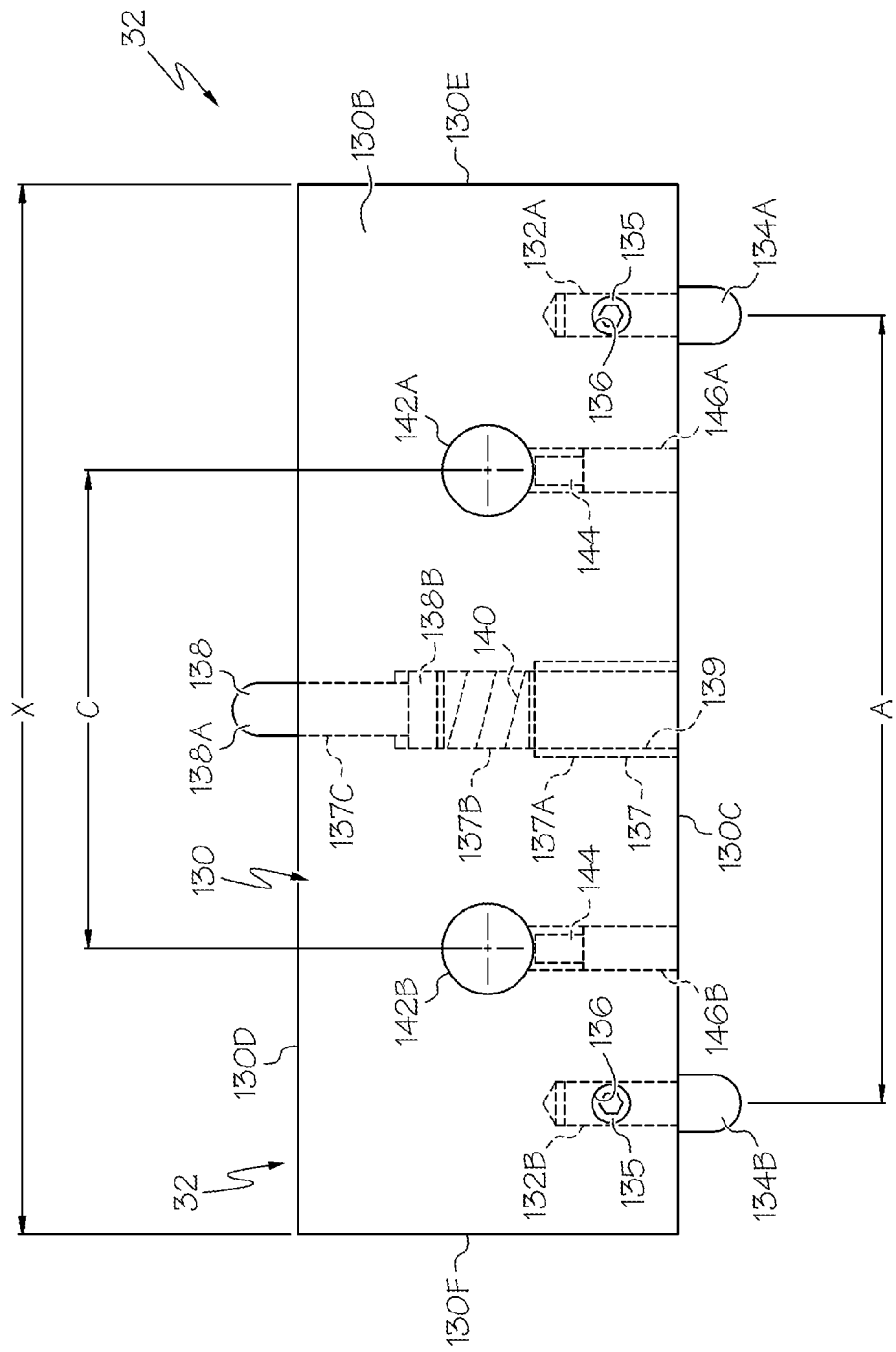
FIG. 5 is a view of the fixture looking down on its lower surface.
Figure 6:
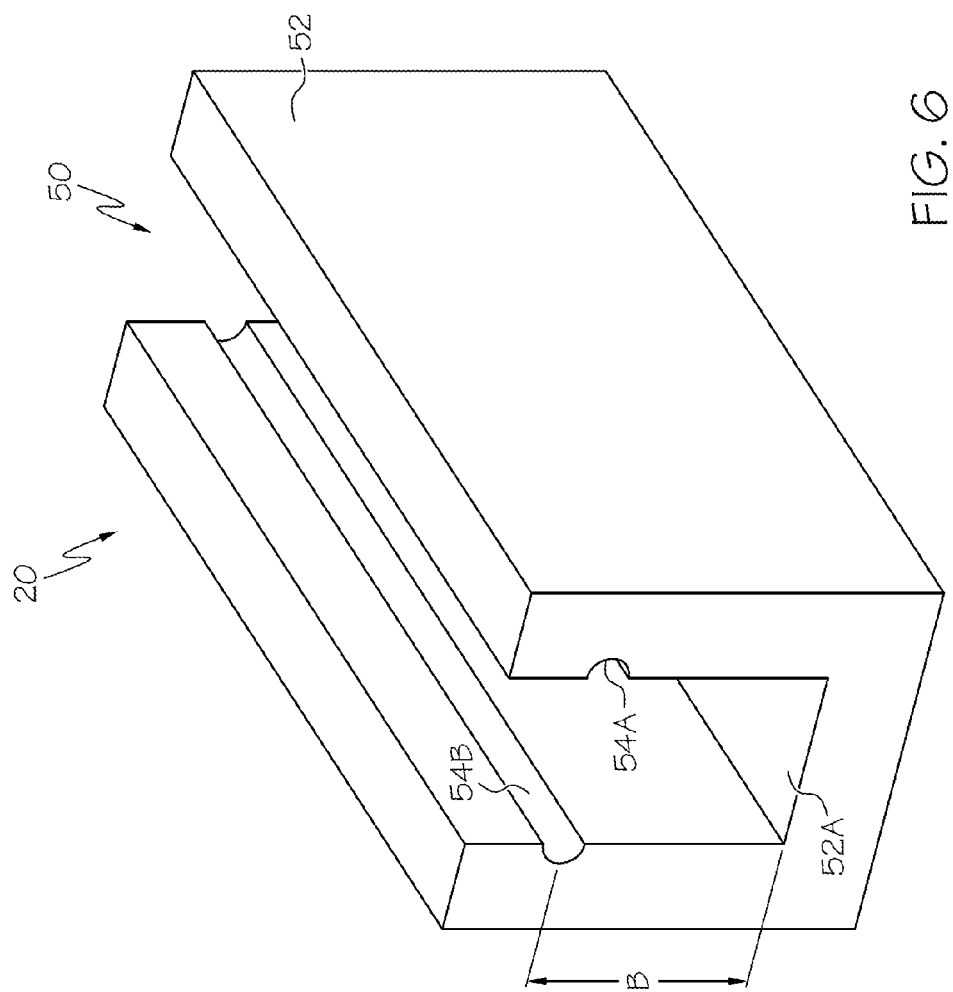
FIG. 6 is a perspective view of a calibration block.
Figure 7:
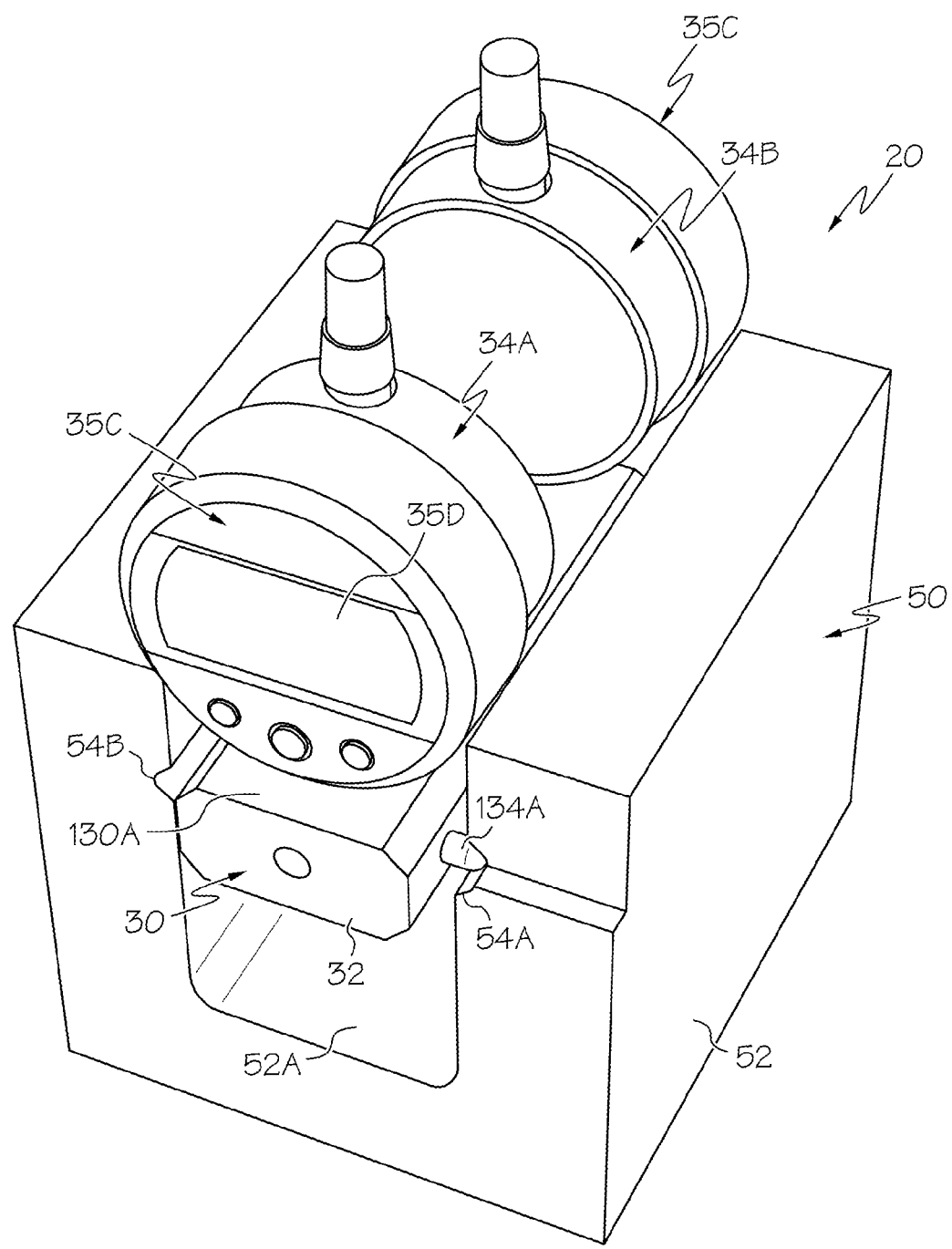
FIG. 7 is a perspective view of the measuring tool positioned in the calibration block.

The fixture 32 may comprise a main body 130 having a generally rectangular shape. In the illustrated embodiment, the main body 130 may have a length X equal to about 113 mm. The main body 130 has upper and lower surfaces 130A and 130B, first and second side surfaces 130C and 130D and first and second end surfaces 130E and 130F, see FIGS. 3-5. The main body 130 further comprises first and second bores 132A and 132B extending inwardly from the first side surface 130C for respectively receiving first and second locating elements 134A and 134B.

The first and second locating elements 134A and 134B are spaced apart from one another by a first distance A, which, in the illustrated embodiment is about 84 mm. Set screws 135 extending through corresponding threaded bores 136 extending inwardly from the lower surface 130B secure the first and second locating elements 134A and 134B to the main body 130 in a fixed state. The main body 130 further comprises a third bore 137 extending from the first side surface 130C to the second side surface 130D. The bore 137 has first, second and third sections 137A-137C. The first section 137A has a diameter greater than that of the second and third sections 137B and 137C and the second section 137B has a diameter greater than that of the third section 137C, see FIG. 5. The third bore 137 is generally centrally located between the first and second end surfaces 130E and 130F. A third locating element 138 is provided in the third bore 137. The third locating element 138 comprises a pin portion 138A and a base portion 138B. The pin portion extends through and out the third section 137C of the third bore 137. The base portion 138B is located in the second section 137B of the third bore 137 and engages a section of the main body 130 defining the second section 137B so as to prevent the third locating element 138 from passing completely through the third section 137C of the third bore 137. A spring 140 is provided in the second section 137B of the third bore 137. A screw cap 139 threadedly engages and is received within the first section 137A, which is threaded, of the third bore 137. The screw cap 139 engages and maintains the spring 140 within the second section 137B. Hence, the third locating element 138 is biased outwardly via the spring 140.

The main body 130 further comprises fourth and fifth bores 142A and 142B, which extend completely through the main body 130 from the upper surface 130A to the lower surface 130B. The fourth and fifth bores 142A and 142B are separated from one another by a distance C, which, in the illustrated embodiment, is equal to about 51 mm. The fourth and fifth bores 142A and 142B receive respectively the first and second depth measuring devices 34A and 34B. Sixth and seventh bores 146A and 146B extend inwardly from the first side surface 130C. Set screws 144 are provided in the sixth and seventh bores 146A and 146B, see FIG. 5, to releasably couple the first and second measuring devices 34A and 34B to the main body 130.

Before the measuring tool 30 is mounted between a pair of adjacent steeples 12 to measure the depth D of a corresponding groove 14, the measuring tool 30 is first mounted within the calibration block 50 so as to allow the first and second depth measuring devices 34A and 34B to be calibrated. In the illustrated embodiment, the calibration block 50 comprises a U-shaped structure 52 having slots 54A and 54B for receiving the first, second and third locating elements 134A, 134B and 138 of the measuring tool 30. The block 50 has an inner bottom surface 52A. The slots 54A and 54B are located a distance B from the bottom surface 52A, which distance B is equal to the predefined, designed depth value for each groove 14. Hence, once the measuring tool 30 is mounted in the calibration block 50 such that the first and second locating elements 134A and 134B are located in the first slot 54A and the third locating element 138 is located in the second slot 54B, the first and second measuring device 34A and 34B can be calibrated to the predefined, designed depth value for a groove 14. In the illustrated embodiment, the first and second measuring devices 34A and 34B are calibrated when their visible displays 35D have a zero reading.

Figure 2:
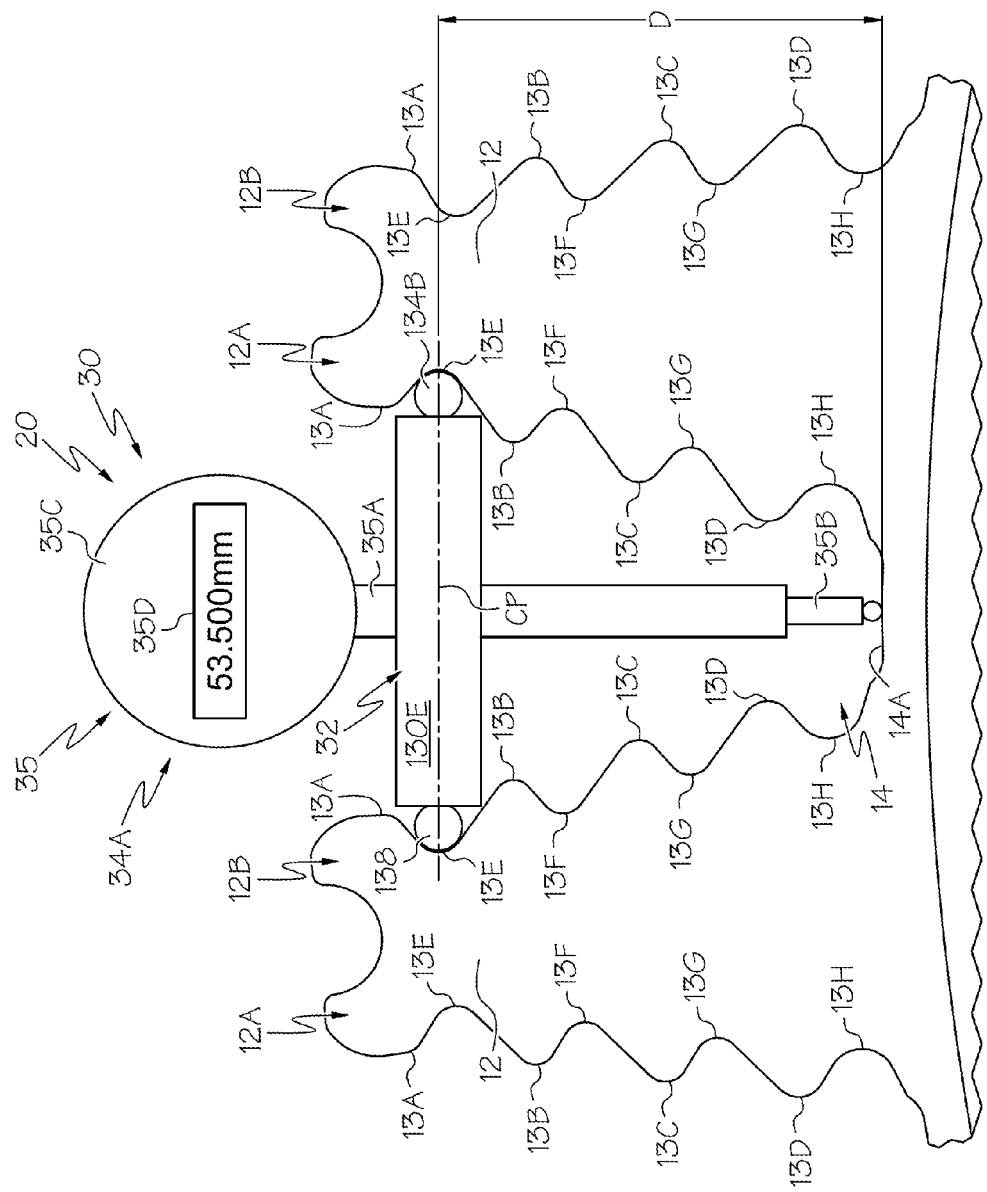
FIG. 2 is a view of a pair of steeples with a measuring tool positioned in a groove between the two steeples.

Once the first and second measuring devices 34A and 34B have been calibrated, the measuring tool 30 is removed from the block 50 and positioned in a next groove 14 to be measured, i.e., between a pair of steeples 12 so as to measure the depth D of the groove 14 between those steeples 12, see FIGS. 1 and 2.

In the illustrated embodiment, each steeple 12 comprises on each of opposing first and second sides 12A and 12B: first, second, third and fourth teeth 13A-13D and first, second, third and fourth slots 13E-13H between the teeth 13A-13D, see FIG. 2.

When the measuring tool 30 is mounted within the groove 14 between a pair of steeples 12, the first and second locating elements 134A are positioned within a first slot 13E of one of the steeples 12, while the third locating element 138 is positioned within a first slot 13E of the other, opposing steeple 12, see FIG. 2. A technician mounting the measuring tool 30 need only compress the third locating element 138 while inserting the tool 30 into the groove 14 to allow the third locating element 138 to avoid the first tooth 13A. When a compressive force is no longer applied to the spring-biased third locating element 138, it will expand into the first slot 13E and contact its corresponding adjacent steeple 12 so as to secure the measuring tool 30 in position between the two adjacent steeples 12.

The depth D of the groove 14, as determined by each measuring device 34A, 34B, extends from a center plane CP on the fixture 32 to a base or lower surface 14A of the groove 14, see FIG. 2. When zero creep has occurred, i.e., the depth D of the groove 14 has not changed from its original value, the depth D will equal the predefined, designed depth value for a groove 14.

After the measuring tool 30 has been positioned between two adjacent steeples 12, a technician then takes readings from the first and second measuring devices 34A and 34B, which readings provide the depth D of the groove 14 at two axially spaced apart locations. When zero creep has occurred, i.e., the depth D of the groove 14 has not changed from its original value, the visible displays 35D on the first and second measuring devices 34A and 34B will have values of zero. As noted above, if the depth D of the groove 14 at a given axial measurement location differs from the predefined, designed depth value, then the corresponding measuring device 34A and 34B will indicate the amount, i.e., magnitude, by which the groove depth D is different from the predefined value. The visible screen 35D may also provide a sign, either positive or negative, indicating if the depth D is greater than or less than the predefined, designed value.

The technician may calibrate the measuring tool 30 using the calibration block 50 each time before inserting the tool 30 into a groove 14 to measure the depth of the groove.

Determining the depth D of a groove 14 at two spaced apart locations preferably occurs without removing and reinserting the measuring tool 30 in the groove 14 between taking the two measurements. In one known turbine section, the rotor comprises 63 circumferentially spaced apart grooves 14 in a third row of steeples/grooves.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Apparatus for measuring a depth of a groove defined between adjacent steeples of a rotor of a turbine, the groove being adapted to receive a root of a blade, said apparatus comprising:
   a measuring tool comprising:
      a fixture; and
      first and second depth measuring devices associated with said fixture for measuring the depth of the groove at two spaced apart locations;
   wherein said first and second depth measuring devices are mounted to said fixture and include axially spaced apart measuring probes, each movable to provide a depth measurement of the groove relative to said fixture at two axially spaced apart locations along a length of the groove.

2. The apparatus as set forth in claim 1, wherein said fixture comprises a main body and at least one locating element extending from said main body to engage with at least one steeple so as to properly locate the main body relative to the at least one steeple.

3. The apparatus as set forth in claim 2, wherein said at least one locating element comprises a first locating element extending from a first side of said main body for engaging a first rotor steeple and a second locating element extending from a second side of said main body for engaging a second rotor steeple.

4. The apparatus as set forth in claim 3, wherein said first locating element is spring biased.

5. The apparatus as set forth in claim 1, wherein each of said first and second depth measuring devices comprises a dial indicator.

6. The apparatus as set forth in claim 1, wherein said first and second depth measuring devices comprise visible displays which face in opposite directions.

7. Apparatus for measuring a depth of a groove defined between adjacent steeples of a rotor of a turbine, the groove being adapted to receive a root of a blade, said apparatus comprising:
   a measuring tool comprising:
      a fixture;
      first and second depth measuring devices associated with said fixture for measuring the depth of the groove at two spaced apart locations; and
   further comprising a calibration block for receiving said measuring tool so as to allow said first and second depth measuring devices to be calibrated.

8. The apparatus as set forth in claim 7, wherein said fixture comprises a main body, a first locating element extending from a first side of said main body and a second locating element extending from a second side of said main body.

9. The apparatus as set forth in claim 8, wherein said calibration block comprises a U-shaped structure having slots for receiving said first and second locating elements when said measuring tool is located in said calibration block.

10. A process for measuring a depth of a groove defined between adjacent steeples of a rotor of a turbine, the groove being adapted to receive a root of a blade, the process comprising:

providing a measuring tool comprising a fixture and first and second depth measuring devices associated with the fixture;

locating the measuring tool within the groove defined between the adjacent rotor steeples; and determining the depth of the groove at two spaced apart locations using the first and second depth measuring devices.

11. The process as set forth in claim 10, further comprising calibrating the first and second depth measuring devices prior to locating the measuring tool within the groove.

12. The process as set forth in claim 11, wherein each of the first and second measuring devices comprises a dial indicator and said calibrating comprises:

placing the measuring tool in a calibration block such that the fixture is located a predetermined distance from a bottom surface of the calibration block; and, thereafter, adjusting each dial indicator.

13. The process as set forth in claim 12, wherein said adjusting comprises zeroing out each indicator.

14. The process as set forth in claim 10, wherein said fixture comprises a main body, a first locating element extending from a first side of said main body and a second locating element extending from a second side of said main body.

15. The process as set forth in claim 14, said locating comprising positioning the measuring tool within the groove defined between the adjacent rotor steeples such that the first locating element is positioned between adjacent teeth on a first rotor steeple and the second locating element is positioned between adjacent teeth on a second rotor steeple.

16. The process as set forth in claim 10, wherein said first and second depth measuring devices are mounted to said fixture axially spaced apart, said determining comprising measuring the depth of the groove at two axially spaced apart locations.

17. The process as set forth in claim 10, wherein said determining the depth of the groove at two spaced apart locations occurs without removing and reinserting the measuring tool in the groove.

* * * * *